United States Patent
Hakola et al.

(10) Patent No.: US 9,999,002 B2
(45) Date of Patent: Jun. 12, 2018

(54) UPLINK POWER SCALING FOR DUAL CONNECTIVITY

(71) Applicant: AVAGO TECHNOLOGIES GENERAL IP (SINGAPORE) PTE. LTD., Singapore (SG)

(72) Inventors: Sami Jukka Hakola, Kempele (FI); Helka-Liina Maattanen, Helsinki (FI); Karl Marko Juhani Lampinen, Oulu (FI)

(73) Assignee: Avago Technologies General IP (Singapore) Pte. Ltd., Signapore (SG)

( * ) Notice: Subject to any disclaimer, the term of this patent is extended or adjusted under 35 U.S.C. 154(b) by 107 days.

(21) Appl. No.: 14/665,892

(22) Filed: Mar. 23, 2015

(65) Prior Publication Data

US 2015/0271765 A1     Sep. 24, 2015

Related U.S. Application Data

(60) Provisional application No. 61/968,443, filed on Mar. 21, 2014.

(51) Int. Cl.
| | |
|---|---|
| *H04W 52/28* | (2009.01) |
| *H04W 52/34* | (2009.01) |
| *H04W 52/36* | (2009.01) |
| *H04W 52/14* | (2009.01) |

(52) U.S. Cl.
CPC ......... *H04W 52/281* (2013.01); *H04W 52/34* (2013.01); *H04W 52/367* (2013.01); *H04W 52/143* (2013.01)

(58) Field of Classification Search
None
See application file for complete search history.

(56) References Cited

U.S. PATENT DOCUMENTS

| | | | |
|---|---|---|---|
| 2015/0201383 A1* | 7/2015 | Papasakellariou .. | H04W 52/367 370/278 |
| 2016/0302235 A1* | 10/2016 | Hwang ................. | H04W 74/08 |

OTHER PUBLICATIONS

3rd Generation Partnership Project; Technical Specification Group Radio Access Network; Evolved Universal Terrestrial Radio Access (E-UTRA); Physical layer procedures (Release 11); 36.213, V11.5.0, Section 5.1.1.1, pp. 12-19 (Dec. 2013).

* cited by examiner

*Primary Examiner* — Mohammad S Adhami
(74) *Attorney, Agent, or Firm* — Oblon, McClelland, Maier & Neustadt, L.L.P.

(57) ABSTRACT

A device includes circuitry configured to determine that pending transmissions on two or more physical channels overlap in time and determine that a total transmit power of the pending transmissions exceeds a maximum transmit power. The circuitry is also configured to assign priorities to the pending transmissions based on one or more predetermined criteria. Power scaling is applied to at least one lower priority transmission so that the total transmission power of the pending transmissions is less than or equal to the maximum transmit power.

17 Claims, 5 Drawing Sheets

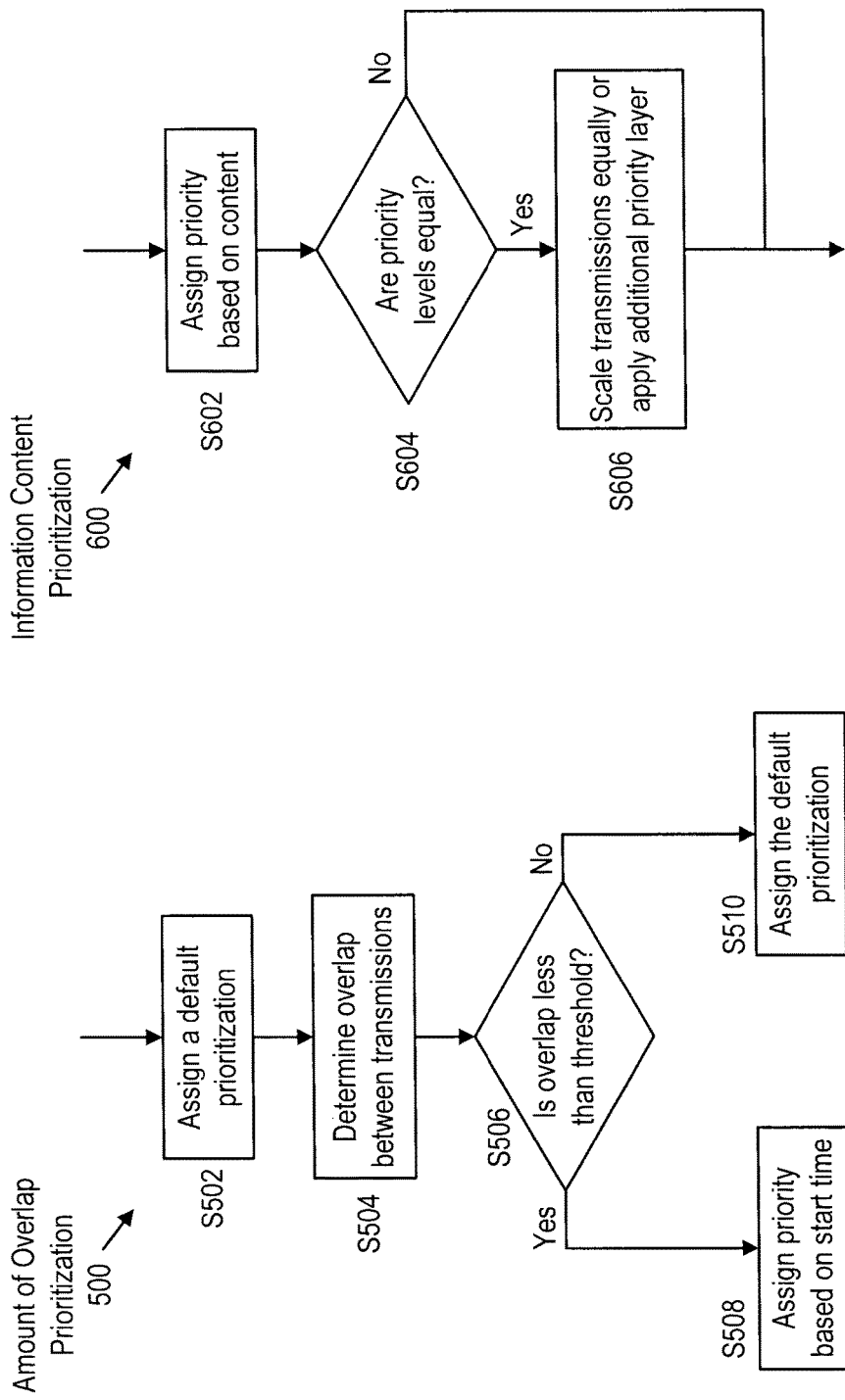

UPLINK POWER SCALING FOR DUAL CONNECTIVITY

CROSS-REFERENCE TO RELATED PATENT APPLICATIONS

The present application claims the benefit of the earlier filing date of U.S. provisional application 61/968,443 having common inventorship with the present application and filed in the U.S. Patent and Trademark Office on Mar. 21, 2014, the entire contents of which being incorporated herein by reference.

BACKGROUND

Technical Field

The present disclosure is related to wireless communications systems, methods, devices, and computer-implemented processes. More specifically, the disclosure relates to power scaling operations for user equipment (UE) having dual connectivity to at least two different cells or transmission reception points.

Description of the Related Art

In the Third Generation Partnership Project (3GPP) for Evolved UMTS Terrestrial Radio Access Network (E-UTRAN, also referred to as Long Term Evolution or LTE including LTE-Advanced), there has been interest in having dual connectivity user equipment (UE). With dual connectivity, a UE in a Radio Resource Control (RRC) Connected state can be configured to simultaneously utilize radio resources provided by independent E-UTRAN Node Bs (eNodeBs or eNBs), one characterized as a Master eNB (MeNB) and the other characterized as a Secondary eNB (SeNB), operating on different frequency carriers.

In addition, multiple serving cells can be configured for the UE associated with the MeNB and/or SeNB. A master cell group (MCG) is a group of serving cells associated with the MeNB and a secondary cell group (SCG) is a group of the serving cells associated with the SeNB. The physical layer and the medium access control (MAC) layer of the MeNB and SeNB operate independently in a dual connectivity connection of the UE. The backhaul between the MeNB and SeNB is assumed to be non-ideal, which means that coordinated scheduling decisions between the MeNB and SeNB may not be feasible due to timing considerations.

One solution for achieving dual connectivity proposed by Nokia in meeting document R1-140560 of the 3GPP TSG RAN WG1 Meeting #76 is to is to coordinate random access channel (RACH) resources to prevent parallel physical RACHs (PRACHs) from being transmitted by a given UE in a time-overlapped fashion. In a synchronized network where coordination among the MeNB and SeNB cannot be assumed, the preambles of the MCG and SCG are alternated after the maximum transmit power is achieved, which may require that two MAC entities and the UE interact with each other to determine whether or not both preambles could be transmitted within the total transmission power budget. In addition, the two pending PRACH preambles may only partially overlap in the time domain (for instance, for only a portion of a symbol). The MAC layer typically operates on the granularity of subframes, which may not accommodate determining partial overlap in the time domain. The meeting document R1-140560 also suggests that the UE can transmit the preamble whose transmission was started earlier and drop the preamble associated with the later transmission.

3GPP TS 36.213 v11.5.0, section 5.1.1.1, the contents of which are incorporated herein by reference in its entirety, describes power control in a shared physical uplink channel. The UE is able to simultaneously transmit a PRACH on one component carrier, and one type of physical uplink control channel (PUCCH) on the other component carrier but is unable to transmit two PRACHs simultaneously. The types of PUCCHs can include PUCCH and physical uplink shared channel (PUSCH), PUSCH with uplink control information (UCI), PUSCH without UCI, and. Based on the transmission options provided in Release 11, the UE performs transmission power scaling if a total transmission power is going to be exceeded reducing a scheduled transmit power on the least prioritized channels until the total transmit power falls within the maximum allowable transmit power. The physical channels are prioritized in the following order (from highest to lowest): PRACH, PUCCH, PUSCH with UCI, PUSCH without UCI, SRS.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is an exemplary flowchart of an amount of overlap prioritization process, according to certain embodiments;

FIG. 6 is an exemplary flowchart of an information content prioritization process, according to certain embodiments.

DETAILED DESCRIPTION

Figure 1:
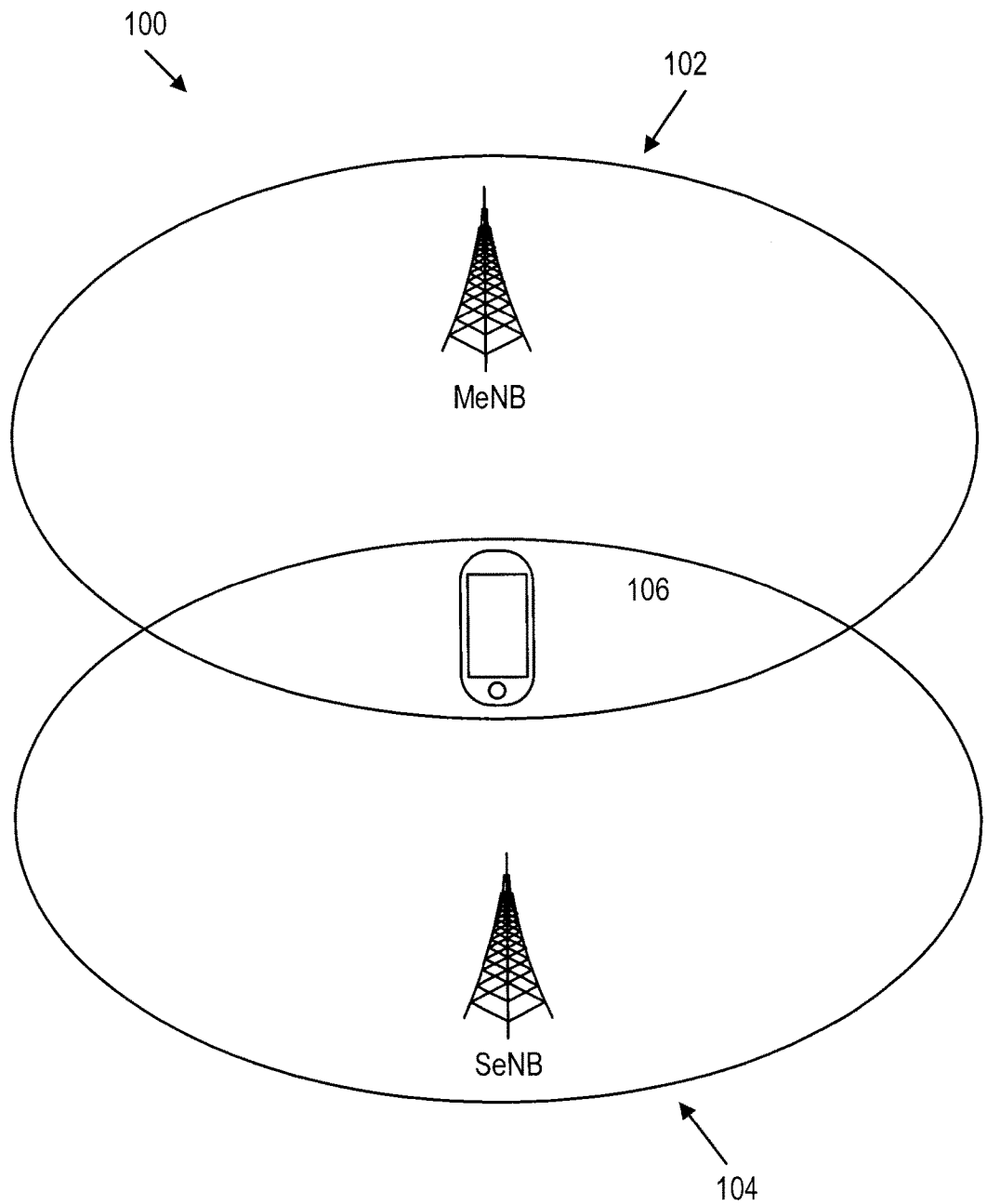
FIG. 1 is an exemplary illustration of a dual connectivity radio environment, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

Aspects of this disclosure are directed to a UE operating with dual connectivity in a E-UTRAN network. The embodiments described herein are merely exemplary and are not meant to limit the scope of the disclosure. For example, the disclosure is directed to a UE having two simultaneous eNB connections, but the implementations described herein can also be applied to UEs having greater than two simultaneous connections. In addition, the embodiments described herein can also be applied to other types of wireless systems and radio access technologies, including UTRAN, LTE-Advanced (LTE-A), and High Speed Packet Access (HSPA), and the like.

FIG. 1 is an exemplary illustration of a dual connectivity radio environment 100, according to certain embodiments.

The radio environment 100 can be a heterogeneous radio environment where a UE 106 can have a RCC connection with master eNB (MeNB) 102 at a first frequency, F1, and a secondary eNB (SeNB) 104 on a second frequency, F2. In some implementations, other serving cells can be associated with the MeNB 102 and SeNB 104 that are considered to be part of a master cell group (MCG) for the MeNB 102. In addition, the SeNB 104 can also have other serving cells that are considered to be part of a secondary cell group (SCG) for the SeNB 104.

In certain embodiments, the UE 106 is a device that can include, but is not limited to personal portable digital devices having wireless communication capabilities, such as cellular and other mobile phones including smartphones, navigation devices, laptop/palmtop/tablet computers, digital cameras and music devices, Internet appliances, USB dongles and data cards. Such portable digital devices may be implemented as radio communications handsets, wearable radio communications terminals, implanted radio communications terminals, and/or combinations of these.

Dual connectivity, also referred to as dual operation, refers to the UE 106 in the RCC CONNECTED state consuming radio resources provided by at least two independent network points, such as the MeNB 102 and the SeNB 104 that can be connected to one another with a non-ideal backhaul. Non-ideal backhaul can refer to connections that may not meet the latency and throughput requirements for ideal backhaul as described by section 6.1.3 of 3GPP TR 36.932 v12.1.0, section 6.1.3. In addition, the non-ideal backhaul between the MeNB 102 and the SeNB 104 can be referred to as an $X_n$ interface. The dual connection of the UE 106 may result from a single radio bearer being split amongst the MeNB 102 and the SeNB 104, which can be referred to as a bearer split. The bearer split may occur at a serving gateway, or at the MeNB 102. In certain embodiments, the SeNB 104 may be considered a small cell, operating with reduced transmit power as compared to the MeNB 102, which which can be considered a macro eNB. In addition, the SeNB 104 can have a coverage area that is fully, or at least partially, enveloped by that of the MeNB 102.

According to certain embodiments, configuring the UE 106 for dual connectivity can have implications for uplink (UL) power control and transmit power management. For example, the UE 106 can support parallel preamble transmissions for the MeNB 102 physical random access channel (PRACH) and the SeNB 104 PRACH when the UE 106 is not power-limited. Thus, the PRACH preambles transmitted to the MeNB 102 and to the SeNB 104 may overlap in the time domain, partially or fully. However, for the UE 106 that is power-limited while sending parallel PRACH preamble transmissions to the MeNB 102 and SeNB 104, the power of at least one preamble transmission can be scaled so that the allowed transmit power for the UE 106 is not exceeded. Details regarding processes for determining priority for UE 106 transmission and power scaling for dual PRACH preambles are discussed further herein.

Physical uplink control channel (PUCCH) transmissions in dual connectivity can also be affected by power scaling operations in power-limited UEs 106. Like the overlapping PRACH preamble transmissions discussed previously, the UE 106 that is configured for dual connectivity can transmit the PUCCH for the UE 106 to both MeNB 102 and SeNB 104 in parallel. In some implementations, the two PUCCHs transmitted on different cell groups (CGs) overlap in the time domain, partially or totally. For the UE 106 that is power-limited while sending parallel PUCCH transmissions to the MeNB 102 and SeNB 104, the power of at least one preamble transmission can be scaled so that the allowed transmit power for the UE 106 is not exceeded. Details regarding processes for determining priority for UE 106 transmission and power scaling for dual PUCCH transmissions are discussed further herein.

In some implementations of dual PUCCH transmissions, independent power control loop parameters and (open loop) power control parameters can be applied to the SeNB 104 because a second PUCCH sent to the SeNB 104 may be received at a different reception point than a first PUCCH sent to the MeNB 102. The non-ideal backhaul can affect the power control scaling operations for the PUCCH since the schedulers of MeNB 102 and SeNB 104 operate independently from one another. In addition, the UL resources can be configured independently, and the eNBs may not be able to exchange information on scheduling decisions in accordance with a transmission time interval (TTI).

Figure 2:
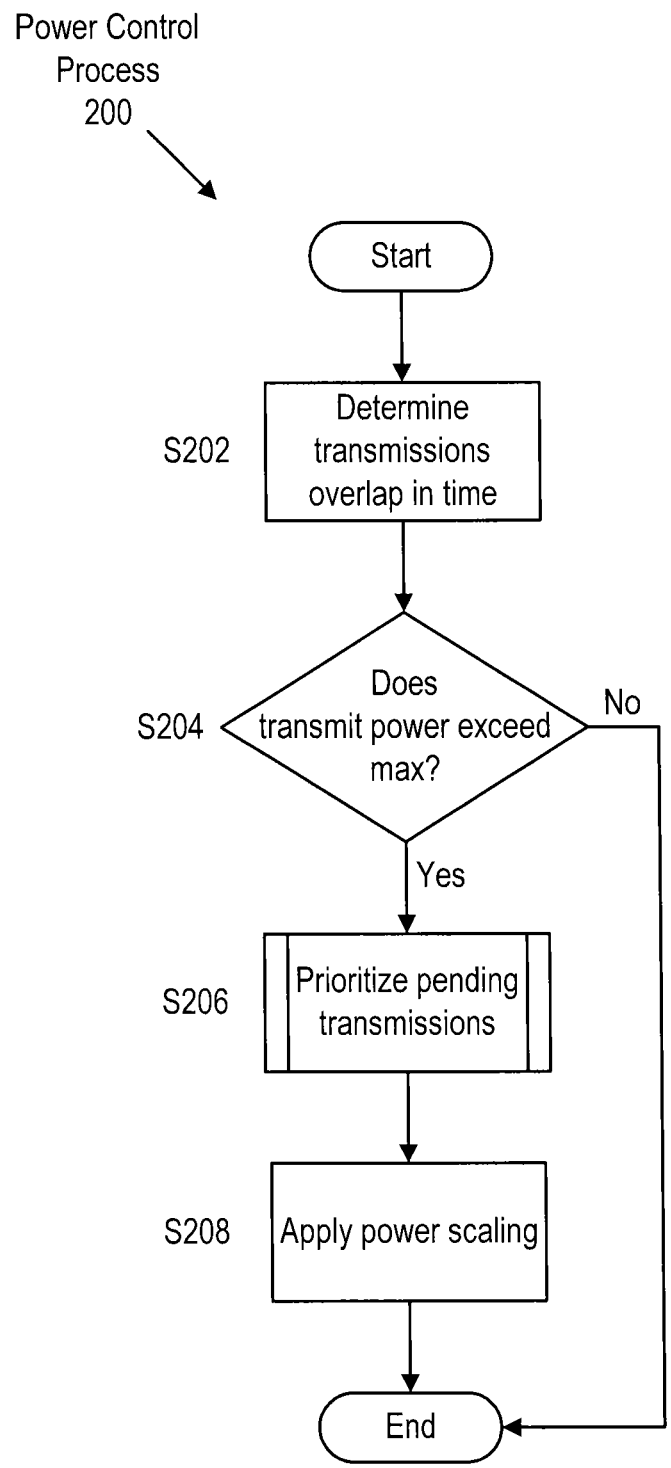
FIG. 2 is an exemplary flowchart of an uplink power control process, according to certain embodiments.

FIG. 2 is an exemplary flowchart of a power scaling control process 200, according to certain embodiments. The processes described herein provide methods of transmission prioritization for the UE 106 operating with dual connectivity. In an embodiment, one of the two or more pending transmissions is to the MeNB 102 and another is to the SeNB 104. In some of the implementations described herein, the multiple pending transmissions are preambles to be sent on respective PRACHs to the MeNB 102 and the SeNB 104, respectively. Processing circuitry of the UE 106 selects one or more channels on which to reduce power when it is anticipated that the two or more overlapping transmissions of the UE 106 will exceed the maximum transmit power for the UE 106. Dual connectivity power scaling for uplink physical channels transmitted to at least two different cells or to at least to two different reception points are described further herein.

At step S202, the processing circuitry of the UE 106 determines that two or more pending transmissions overlap in time on two or more physical channels. For example, the processing circuitry can determine that parallel PRACH preamble transmissions are being sent to the MeNB 102 and SeNB 104. The processing circuitry can also determine that two PUCCHs transmitted on different cell groups (CGs) overlap in the time domain.

At step S204, the processing circuitry determines whether the total transmit power for the two or more transmissions exceeds a predetermined maximum transmit power. If the processing circuitry determines that the maximum transmit power for the UE 106 will be exceeded by transmitting the overlapping transmissions simultaneously, resulting in a "yes," then step S206 is performed. Otherwise, if the processing circuitry determines that the maximum transmit power for the UE 106 will not be exceeded by transmitting the overlapping transmissions simultaneously, then the power control process 200 is terminated and the two or more pending transmissions are transmitted to the MeNB 102 and the SeNB 104.

If it is determined at step S204 that the maximum transmit power for the UE 106 will be exceeded by transmitting the overlapping transmissions simultaneously, then at step S206, the processing circuitry prioritizes the two or more pending transmissions so that one or more lower prioritized transmissions can be power scaled so that the maximum transmit power for the UE 106 is not exceeded. The one or more transmissions can be prioritized based on one or more criteria that include a trigger or root cause of the pending transmissions, a start time of a procedure with which the physical channel transmission is associated, a degree and/or amount of overlap between transmissions, and the information content of the two or more pending transmissions. Details regarding the criteria for prioritization of the two or more pending transmissions are discussed further herein.

At block 208, based on the channel prioritization determinations made at step S206, the UE 106 applies power scaling to at least one of the selected pending transmissions so as not to exceed the maximum allowable transmit power. According to certain embodiments, the selected pending transmission is that which has the lower (or lowest if more than two) priority as determined at step S206, and the power scaling applied reduces the originally scheduled transmit power for that lower/lowest priority pending transmission. In some implementations, the transmit power of the lower/lowest prioritized transmission is reduced by a factor such that the total transmit power of the two or more pending transmissions is less than the maximum allowable transmit power. The processing circuitry can also delay the transmission of the lower/lowest prioritized transmissions so that the transmissions are not transmitted simultaneously.

Figure 3:
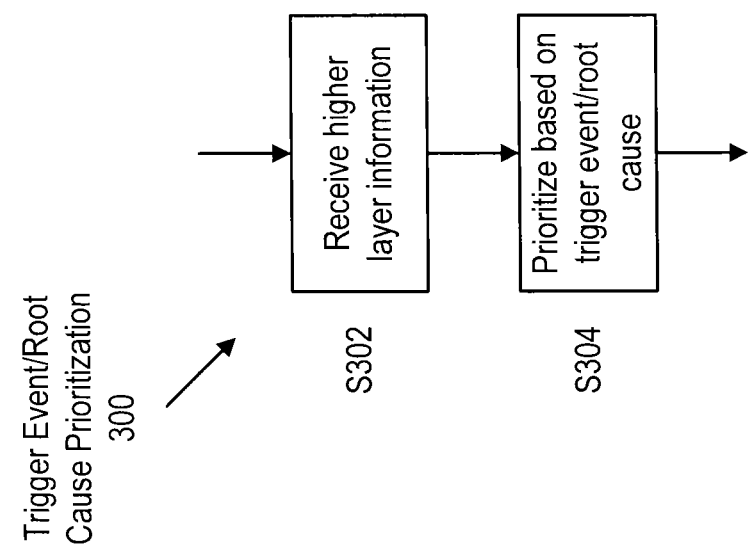
FIG. 3 is an exemplary flowchart of a root cause prioritization process, according to certain embodiments.

FIG. 3 is an exemplary flowchart of a root cause prioritization process 300, according to certain embodiments. The root cause prioritization process 300 describes one implementation of the pending transmission prioritization of step S206 of the power scaling control process 200.

At step S302, a higher network layer, such as the media access control (MAC) layer (L2) or network layer (L3), transmit root cause data to the physical layer (L1) in a one-way transmission so that the processing circuitry of the UE 106 can prioritize the two or more pending transmissions based on the root cause or trigger event for the transmissions. For example, the higher level root cause data can include the network layer initiating the transmission, the type of procedure the transmission is associated with, and the like.

At step S304, the processing circuitry prioritizes the pending transmissions based on the trigger event or root cause of why the transmissions are being sent. In one exemplary implementation, when there are two or more overlapping PRACH transmissions, a network triggered random access procedure may have higher priority than a UE-initiated random access procedure. Correspondingly, the preambles would be prioritized along with the associated pending PRACH transmissions. In addition, for network triggered preambles, random access procedures and preambles triggered by a higher layer in the network would have higher priority than the overlapping preamble transmission triggered by a lower layer in the network. For example, random access procedures and preambles triggered by the MAC layer (L2) can have a higher priority than random access procedures and preambles triggered by the physical layer (L1).

In another implementation with overlapping PRACH preamble transmissions, RRC-configured preambles for a contention-free Random Access procedure in a handover may have a higher priority than preambles associated with the Random Access procedure triggered by the network via a physical downlink control channel (PDCCH) order, such as where the network sends downlink data when the UE 106 is not yet synchronized on the uplink.

Figure 4:
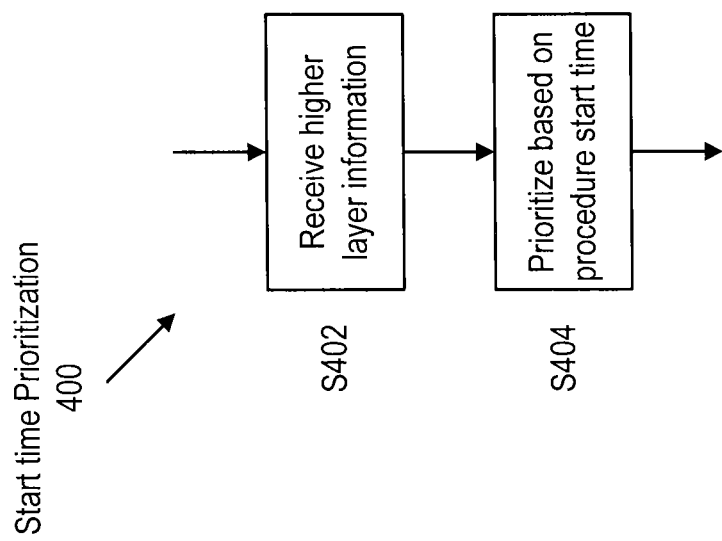
FIG. 4 is an exemplary flowchart of a start time prioritization process, according to certain embodiments.

FIG. 4 is an exemplary flowchart of a start time prioritization process 400, according to certain embodiments. The start time prioritization process 400 describes one implementation of the pending transmission prioritization of step S206 of the power scaling control process 200.

At step S402, a higher network layer, such as the MAC layer (L2) or network layer (L3), transmit start time data to the physical layer (L1) in a one-way transmission so that the processing circuitry of the UE 106 can prioritize the two or more pending transmissions based on the start times of underlying random access procedures with the pending transmissions are associated. In some implementations, the start time for the procedures is associated into an "age" so that transmissions associated with older age procedures are prioritized higher than lower age procedures. For example, the higher level root cause data can include the network layer initiating the transmission, an "age" of procedure the transmission is associated with, and the like.

At step S404, the processing circuitry prioritizes the pending transmissions based on the start times of the transmissions are being sent. In some implementations, the priority of the pending transmissions is based on the start time of the procedure with which the physical channel transmission is associated. For example, the preamble associated with the random access procedure that has been initiated earlier than the other possible on-going random access procedure would be prioritized higher than a preamble for a later initialized random access procedure.

In addition, the processing circuitry can prioritize the pending transmissions based on a number of retransmissions of the preambles. For example, a pending transmission can have some integer number N of pending retransmissions. In this example, the n:th transmission of a preamble would have a higher priority than the (n−1):th transmission of another preamble. More specifically, a $2^{nd}$ retransmission to the SeNB 104 can have higher priority than a $1^{st}$ transmission to the MeNB 102.

FIG. 5 is an exemplary flowchart of an amount of overlap prioritization process 500, according to certain embodiments. The amount of overlap prioritization process 500 describes another implementation of the pending transmission prioritization of step S206 of the power scaling control process 200. According to certain embodiments, the prioritization of the pending transmissions for the UE 106 can be a function of a degree, extent, and or amount of overlapping in the time domain of the competing pending transmissions. For example, there can be a predetermined threshold of a degree and/or amount of overlap in the time domain for which to determine which of the pending transmissions is assigned priority versus which of the pending transmissions is assigned a lower priority and may be subject to power scaling.

At step S502, the processing circuitry of the UE 106 determines a default prioritization for the two or more pending transmissions. For example, in some implementations, the default prioritization includes that transmissions to the MeNB 102 are assigned a higher priority than transmissions to the SeNB 104.

At step S504, the processing circuitry determines an amount of overlap in the time domain for the two pending transmissions. For example, a PRACH preamble transmission toward the SeNB 104 may have an earlier start time than the preamble transmission toward the MeNB 102.

At step S506, it is determined whether the amount of overlap between the two pending transmissions is less than a predetermined threshold, such as X microseconds ($\mu s$). The value of X can also include a number of physical layer time samples and one half or a whole orthogonal frequency division multiplexing (OFDM) or single-carrier frequency division multiple access (SC-FDMA) symbols in the time domain or any other type of time measurement. In addition, the value for the threshold X can also be a parameter written into radio access technology specification in order to avoid having to signal the value of X from the serving cell associated with the UE 106. If the amount of overlap between the two pending transmissions is less or equal to than the predetermined threshold, resulting in a "yes," then step S508 is performed. Otherwise, if the amount of overlap between the pending transmissions is greater than the predetermined threshold, resulting in a "no," then step S510 is performed.

At step S508, if the amount of overlap between the two pending transmissions is less or equal to than the predetermined threshold, then the transmission with the earlier start time is assigned a higher priority than the transmission with the later start time. For example, if the PRACH preamble transmission towards the MeNB 102 is started at most a predetermined number, X, microseconds (µs) before the end of the preamble transmission associated with the SeNB 104, the UE 106 can prioritize the preamble transmission toward the SeNB 104 that has an earlier start time.

At step S510, if the amount of overlap between the two pending transmissions is greater than the predetermined threshold, the processing circuitry applies the default prioritization of step S502. For example, if the transmission toward the MeNB 102 overlaps the earlier transmission toward the SeNB 104 by greater than X µs, the processing circuitry can assign a higher priority to the transmission toward the MeNB 102.

FIG. 6 is an exemplary flowchart of an information content prioritization process 600, according to certain embodiments. The information content prioritization process 600 describes another implementation of the pending transmission prioritization of step S206 of the power scaling control process 200. According to certain embodiments, the information content prioritization process 600 can be applied when two or more parallel pending PUCCH transmissions overlap and are anticipated to exceed the maximum total transmit power for the UE 106. The prioritization of the competing transmissions can based on the information content of the physical channel, and the information can be related to the physical channel (L1), MAC (L2), and/or network layer (L3).

At step S602, the processing circuitry of the UE 106 assigns priorities to the two or more pending transmissions based on the information content of the transmissions. In one implementation, the PUCCH carrying an acknowledgement or negative acknowledgement (ACK/NACK) is prioritized over PUCCH carrying a scheduling request (SR) or a channel quality indicator (CQI).

At step S604, the processing circuitry compares the priorities assigned to the two or more pending transmissions and determines whether the information content priority for the transmissions is equal. If the priority levels assigned to the two or more pending transmissions are equal, resulting in a "yes," then step S606 is performed. Otherwise, if the priority levels assigned to the two or more transmissions are unequal, resulting in a "no," the information content prioritization 600 is terminated.

At step S606, if the processing circuitry has assigned equal priorities to the two or more pending transmissions, then a determination can be made that the transmissions will be equally power scaled or an additional prioritization layer is applied to the transmissions. For example, if both PUCCHs are carrying ACK/NACK information then power scaling can be applied equally to the two PUCCHs. In addition, the PUCCH associated with the MeNB 102 can also be assigned a higher priority.

In some implementations, an additional layer of prioritization can be defined for ACKs and NACKs that can be applied in a case where both (or all) parallel PUCCHs carry ACK/NACK information. An example of this additional layer of prioritization can use one of the other prioritization processes described herein, such as the root cause prioritization process 300, the start time prioritization process 400, and the amount of overlap prioritization process 500. For example, when the start time prioritization process 400 is applied to the additional layer of prioritization, a PUCCH carrying hybrid automatic repeat request (HARQ) ACK/NACK information related to an oldest active HARQ process would be prioritized among the competing PUCCHs carrying ACK/NACK information.

One technical effect of implementing these teachings is that the prioritization options presented herein allow prioritizing high priority physical channels based on information of the different logical layers that are related directly or in-directly to the physical channel transmission in question, while at the same time introducing at most a one-way control signaling transaction from the higher layer(s) to the power scaling function in order to implement the prioritization.

Embodiments of these teachings address transmission power scaling operations, which can support combinations of uplink physical channels transmitted in parallel in dual connectivity. Properly implemented power scaling can ensure that the UE 106 does not exceed the total allowed transmit maximum power by scaling down the transmission power of one or more of the different physical channels on which the UE 106 is sending overlapping uplink transmissions.

A hardware description of the UE 106 according to exemplary embodiments is described with reference to FIG. 7. In addition, the hardware described by FIG. 7 can also apply to the circuitry associated with the MeNB 102, the SeNB 104, and higher level network entities associated with the MAC (L2) and network layer (L3). The UE 106 includes a CPU 700 that perform the processes described above/below. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the UE 106 communicates, such as the MeNB 102 and/or the SeNB 104.

Further, the claimed advancements may be provided as a utility application, background daemon, or component of an operating system, or combination thereof, executing in conjunction with CPU 700 and an operating system such as Microsoft Windows 7, UNIX, Solaris, LINUX, Apple MAC-OS and other systems known to those skilled in the art.

The hardware elements in order to achieve the UE 106 may be realized by various circuitry elements, known to those skilled in the art. For example, CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

Figure 7:
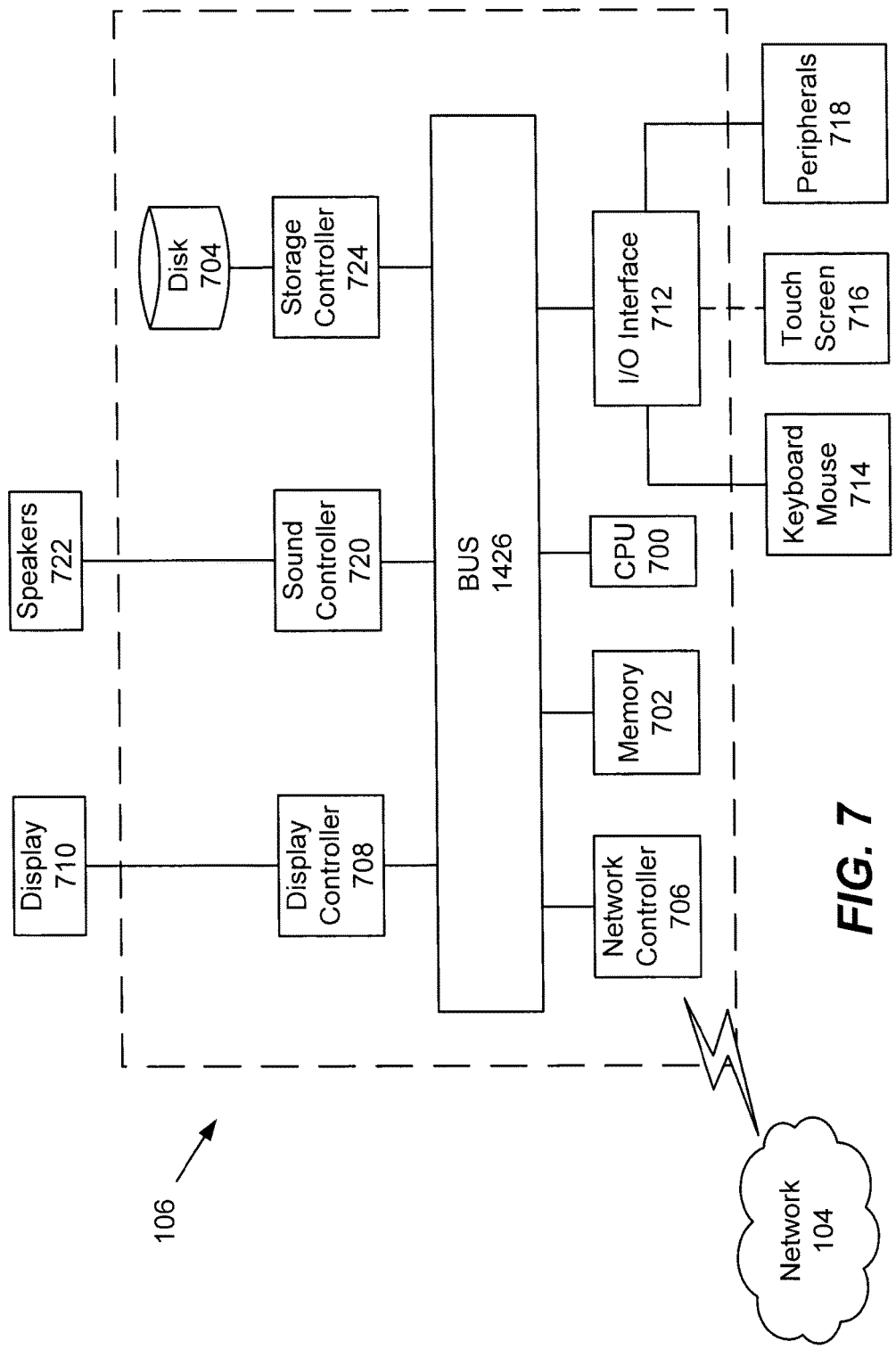
FIG. 7 illustrates a non-limiting example of a UE, according to certain embodiments.

The UE 106 in FIG. 7 also includes a network controller 706, such as an Intel Ethernet PRO network interface card from Intel Corporation of America, for interfacing with network 104. As can be appreciated, the network 104 can be any E-UTRAN/LTE network but can also be a public network, such as the Internet, or a private network such as an LAN or WAN network, or any combination thereof and can also include PSTN or ISDN sub-networks. The network 104 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

In addition, while not particularly illustrated for the UE 106, MeNB 102, and SeNB 104, these devices can include a modem and/or a chipset and/or an antenna chip which may or may not be inbuilt onto a radiofrequency (RF) front end module within the respective host device.

The UE 106 further includes a display controller 708, such as a NVIDIA GeForce GTX or Quadro graphics adaptor from NVIDIA Corporation of America for interfacing with display 710 of the UE, such as a Hewlett Packard HPL2445w LCD monitor. A general purpose I/O interface 712 at the UE 106 interfaces with a keyboard and/or mouse 714 as well as a touch screen panel 716 on or separate from display 710. General purpose I/O interface 712 also connects to a variety of peripherals 718 including printers and scanners, such as an OfficeJet or DeskJet from Hewlett Packard.

A sound controller 720 is also provided in the UE 106, such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the UE 106. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

In other alternate embodiments, processing features according to the present disclosure may be implemented and commercialized as hardware, a software solution, or a combination thereof. Moreover, instructions corresponding to the power control process 200 in accordance with the present disclosure could be stored in a thumb drive that hosts a secure process.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A device comprising:
circuitry configured to
determine that pending transmissions on two or more physical channels overlap in time,
determine that a total transmit power of the pending transmissions exceeds a maximum transmit power,
assign priorities to the pending transmissions based on one or more predetermined criteria, and
apply power scaling to at least one lower priority transmission so that the total transmission power of the pending transmissions is less than or equal to the maximum transmit power, wherein
the circuitry is further configured to assign the priorities to the pending transmissions based on at least a network layer triggering the transmission.

2. The device of claim 1, wherein a first pending transmission is to a master E-UTRAN Node B (eNB) and a second pending transmission is to a secondary eNB.

3. The device of claim 2, wherein the circuitry is further configured to assign a higher priority to the first pending transmission to the master eNB than to the second pending transmission to the secondary eNB.

4. The device of claim 1, wherein the pending transmissions include preambles associated with two or more physical random access channels (PRACHs) to the MeNB and the SeNB.

5. The device of claim 1, wherein the circuitry is further configured to assign the priorities to the pending transmissions based on a network layer triggering the pending transmissions.

6. A method comprising:
determining that pending transmissions on two or more physical channels overlap in time;
determining that a total transmit power of the pending transmissions exceeds a maximum transmit power;
assigning priorities to the pending transmissions based on one or more predetermined criteria; and
applying power scaling to at least one lower priority transmission so that the total transmission power of the pending transmissions is less than or equal to the maximum transmit power, wherein
assigning the priorities to the pending transmissions is based on a network layer triggering the pending transmissions.

7. The device of claim 1, wherein the pending transmissions include preambles associated with two or more physical uplink control channels (PUCCHs) to the MeNB and the SeNB.

8. The device of claim 2, wherein the circuitry is further configured to transmit the first pending transmission to the master eNB at a first frequency and the second pending transmission to the secondary eNB at a second frequency.

9. A device comprising:
circuitry configured to
determine that pending transmissions on two or more physical channels overlap in time,
determine that a total transmit power of the pending transmissions exceeds a maximum transmit power,
assign priorities to the pending transmissions based on one or more predetermined criteria, and
apply power scaling to at least one lower priority transmission so that the total transmission power of the pending transmissions is less than or equal to the maximum transmit power, wherein
the circuitry is further configured to assign a higher priority to a first pending transmission having a first network layer that is higher than a second network layer of a second pending transmission.

10. The device of claim 1, wherein the circuitry is further configured to determine the root cause based on root cause data including at least one of a network layer initiating the pending transmissions or a type of procedure the pending transmissions are associated with.

11. The device of claim 5, wherein the circuitry is further configured to assign a higher priority to a first pending transmission having a first network layer that is higher than a second network layer of a second pending transmission.

12. The method of claim 6, wherein assigning the priorities to the pending transmissions is based on at least one of a trigger event or root cause associated with the pending transmissions.

13. The method of claim 12, further comprising:
determining the root cause based on root cause data including at least one of a network layer initiating the pending transmissions or a type of procedure the pending transmissions are associated with.

14. The method of claim 6, wherein assigning the priorities to the pending transmissions further includes:
assigning a higher priority to a first pending transmission having a first network layer that is higher than a second network layer of a second pending transmission.

15. The method of claim 6, further comprising:
delaying transmission of the at least one lower-priority transmission in a case that the pending transmissions on the two or more physical channels overlap in time.

16. The method of claim 6, wherein a first pending transmission is to a master E-UTRAN Node B (eNB) and a second pending transmission is to a secondary eNB.

17. The method of claim 16, wherein assigning the priorities to the pending transmissions further includes:
assigning a higher priority to the first pending transmission to the master eNB than to the second pending transmission to the secondary eNB.

\* \* \* \* \*